Patented Oct. 2, 1951

2,570,022

UNITED STATES PATENT OFFICE 2,570,022

PRODUCTION OF CHLORINATED METHYL NAPHTHALENES

Herbert Stanislaus Boyd-Barrett, Sale, James Ronald Holker, Monton, and Herbert Steiner, Eccles, England, assignors to Petrocarbon Limited, London, England No Drawing. Application February 24, 1948, Serial No. 10,566. In Great Britain February 24, 1947

5 Claims. (Cl. 260—651)

1

This invention relates to the production of side-chain chlorinated methyl naphthalenes, that is methyl naphthalenes having a chlorine atom substituted in the side-chain.

It is known that vapour phase chlorinations of mono-cyclic aromatic hydrocarbons containing methyl groups, may give substitution of hydrogen of the methyl group. For instance, with toluene, U. S. Patent No. 1,246,739, Gibbs and Geiger, 1917, and British Patent No. 378,866, T. S. Wheeler, November 8, 1932, side-chain chlorination takes place at temperatures above 250° C. with or without presence of ultra-violet light and in the absence of specific catalysts or chlorine carriers. Similar products are obtained from toluene in the liquid phase at temperatures near the boiling point, and in direct sunlight.

It is stated in "Side-chain chlorination of aromatic compounds in the vapour phase" by G. V. Asolkar and P. C. Guha, Journal of the Indian Chemical Society, February, 1946, that in the vapour phase, the chlorination of toluene yields very good results (about 85% conversion) yielding benzyl chloride. This is said to be a better way of chlorinating toluene in the side-chain than the usual method of chlorinating in the liquid phase. The chlorination of the nitro-toluenes in the vapour phase was also expected to proceed in the side-chain especially in the case of the meta- and para-compounds. The ortho-compound may not be chlorinated because of the steric hindrance of the nitro group in the compound. The side-chain chlorination of the meta- and para-compounds has been carried out in the liquid phase (Hanssermann and Beck, Ber., 1892, 25, 2445) but the results are negative in the vapour phase even after prolonged chlorination.

It appears, therefore, that the presence of certain substituents in the ring may affect the chlorination or hydrogen replacement in the side-chain.

The chlorination of alkylated aromatic compounds containing two or more aromatic rings either condensed or linked, so far has always been carried out in the liquid phase, and has resulted in the production of a large proportion of nuclear substituted chloro-compounds particularly at low temperatures. At high temperatures, increased amounts of side-chain derivatives can be obtained from mono-methyl naphthalenes (see Schultze, Ber. 17, 1529; Scherler, Ber. 24, 3930, and Wislicenus and Wren, Ber. 38, 506), but the yields are still unsatisfactory and also large amounts of tarry residues are produced under these conditions.

2

The main object of the present invention is to provide a more efficient process for the production of side-chain chlorinated methyl naphthalenes.

The invention consists in a process for the production of side-chain chlorinated methyl naphthalenes in which process chlorine and methyl naphthalene vapour are separately preheated to, and brought into contact with each other at, a temperature between the vaporisation point of the methyl naphthalene and 500° C. and under a pressure which is substantially atmospheric or higher up to about 2 atmospheres absolute, the time of contact between the reactants at the said temperature being not more than 5 seconds and the chlorine always being present in an amount less than that required stoichiometrically for mono-substitution by chlorine.

The invention also consists in a process in accordance with the preceding paragraph applied for the production of side-chain chlorinated mono-methyl naphthalenes.

The invention also consists in a process in accordance with either of the preceding two paragraphs in which the temperature of the reaction is between 300 and 400° C.

The invention also consists in a process in accordance with any of the preceding three paragraphs in which the time of contact between the reactants is 1 second or less.

The invention also consists in improved processes for the production of side-chain chlorinated methyl naphthalenes and in products which may be made by those processes especially in isolated form.

The following examples illustrate how the invention may be carried into effect:

Example I

A throughput of 150 mls. (calculated as liquid) per hour of the vapour of a mixture of α- and β-methyl naphthalenes preheated to about 300° C. was maintained for 1 hour through a glass reactor, which was filled with glass chips (approximately 50% free space) and surrounded by a furnace which kept the temperature inside the reactor at 300° C. Dry chlorine, preheated to about 300° C. was also fed to the reactor at a rate corresponding to approximately 50% of the amount of chlorine stoichiometrically equivalent to the methyl naphthalenes for mono-substitution. The pressure in the reactor was substantially atmospheric. A contact time of about 5 seconds was allowed, the products leaving the reactor being rapidly cooled by quenching. The liquid product was 153 mls. On fractionation this gave 113 mls. of unchanged methyl naphthalenes of B. P. 115–125° C./15 mm. and 27 mls. of chlorinated products of which 85% was substituted in the side-chain.

Example II

A throughput of 150 mls. (calculated as liquid) per hour of a mixture of the vapour of $\alpha$- and $\beta$-methyl naphthalenes (approximately 50% $\alpha$- and 50% $\beta$-) preheated to about 300° C., was maintained for 1 hour through a glass reactor, consisting of a spiral of 40 cm. straight length and 1.0 cm. internal diameter, kept at 300° C. Dry chlorine preheated to about 300° C. was at the same time fed to the reactor at a rate corresponding with approximately 50% of the amount of chlorine stoichiometrically equivalent to the methyl naphthalenes for mono-substitution. The pressure in the reactor was substantially atmospheric. A contact time of 3 seconds was allowed, the products being rapidly cooled on leaving the reactor. The liquid product was 149 gms. On fractionation this gave 97 gms. of unchanged methyl naphthalenes and 50 gms. of chlorinated methyl naphthalenes. This represents a conversion of 76% of the methyl naphthalenes consumed. 85% of the chlorinated products was found to be substituted in the side-chain.

Example III

A throughput of 150 mls. (calculated as liquid) per hour of the vapour of a mixture of $\alpha$- and $\beta$-methyl naphthalenes preheated to about 300° C. was maintained through a glass reactor consisting of a straight tube of 1 cm. bore, kept at 300° C. At the same time dry chlorine preheated to about 300° C. was fed to the reactor at a rate corresponding to approximately 50% of the amount of chlorine stoichiometrically equivalent to the methyl naphthalenes for mono-substitution. A contact time of one second was allowed and the products leaving the reactor were rapidly cooled. In all 232 gms. of methyl naphthalenes were used and the liquid product was 248 gms. On fractionation this gave 160 gms. unchanged methyl naphthalenes and 66 gms. of chlorinated methyl naphthalenes. This represents a conversion of 74% based on the methyl naphthalenes consumed. 85% of the chlorinated products was found to be substituted in the side-chain.

Example IV

A throughput of 150 mls. (calculated as liquid) per hour of the vapor of a mixture of $\alpha$- and $\beta$-methyl naphthalenes preheated to 380° C. was maintained through a glass reactor, consisting of a straight tube of 1 cm. bore surrounded by a furnace which kept the temperature inside the reactor at 380° C. At the same time dry chlorine, diluted with an equal volume of nitrogen and preheated to 380° C. was fed to the reactor at a rate corresponding to approximately 40% of the amount of chlorine stoichiometrically equivalent to the methyl naphthalenes for mono-substitution. A contact time of one second was allowed and the products leaving the reactor were rapidly cooled. In all 268 gms. methyl naphthalenes were consumed. The liquid product weighed 278 gms. On fractionation this gave 178 gms. of unchanged methyl naphthalenes and 69 gms. of chlorinated methyl naphthalenes. This represents conversion of 74.5% based on the methyl naphthalenes consumed. Over 90% of the chlorinated products was found to be substituted in the side-chain.

General

It is important to have a very short contact time in order to expose the labile chlorine products for a very short time only to high temperatures, thereby reducing the amount of decomposition to a minimum. The time of contact is thus preferably kept just above that at which any chlorine comes through unchanged and at high temperatures may be only a fraction of a second.

The chlorine fed to the reaction zone in the process of the invention may be diluted with an inert gas such as nitrogen.

The process of the invention can be arranged to operate continuously and the unattacked methyl naphthalenes may after separation by fractional distillation be returned to the reactor for further chlorination.

The products leaving the reaction zone are rapidly cooled and are subjected to fractional distillation, the first runnings from which comprise the unattacked methyl naphthalenes of boiling range about 115–125° C./15 mm. Hg. The chlorinated product distils at about 140–160° C./15 mm. Hg in a weight yield of about 70% of the methyl naphthalenes consumed.

In contradistinction to chlorination in the liquid phase even when carried out at high temperatures in the neighbourhood of the boiling point of the methyl naphthalene, the process of the present invention results in chlorinated products containing a high proportion, for example, between 85 and 95%, of a chlorinated product which is substituted in the side-chain.

The reaction vessel may be made of glass or any chlorine resistant material and may or may not be packed. The tarry deposit which settles on the packing and walls of the reactor can easily be removed by oxidation in a current of air at about 500° C. for a short period.

The invention may be applied to methyl naphthalenes in general and to $\alpha$- and $\beta$-mono-methyl naphthalenes in particular.

Chlorinated products of the type claimed are useful intermediates for the production of naphthyl-alcohols, naphthyl-acetic-acids and the like.

We claim:

1. A process for the production of side-chain chlorinated mono-methyl naphthalenes by the vapor phase chlorination of methyl naphthalene, which comprises continuously preheating chlorine and vaporized methyl naphthalene separately and to a temperature between the vaporization point of methyl naphthalene at the pressure employed and 500° C., continuously bringing the two vapors into contact with each other at the above temperature under a pressure of between 1 to 2 atmospheres absolute for a period not to exceed 5 seconds, and continuously regulating the relative amounts of the two gases so that the amount of chlorine vapor in contact with the methyl naphthalene vapor is always less than the stoichiometric amount required for complete mono-substitution by chlorine of all the methyl naphthalene present, and continuously separating the formed chloromethyl naphthalenes from the unreacted methyl naphthalene by fractional distillation.

2. The process of claim 1 in which the time of contact between the reactants does not exceed 1 second.

3. The process of claim 1 wherein the chlorine gas is diluted with an inert gas before it is preheated and fed into the reaction zone.

4. The process of claim 1 wherein the chlorine gas is diluted with nitrogen before it is preheated and fed into the reaction zone.

5. A process for the production of side-chain chlorinated mono-methyl naphthalenes by the vapor phase chlorination of methyl naphthalene, which comprises continuously preheating chlorine and vaporized methyl naphthalene separately to a temperature between 300° and 400° C., continuously bringing the two vapors into contact with each other at the above temperature under a pressure of between 1 to 2 atmospheres absolute for a period ranging from a fraction of a second to 5 seconds and regulating the relative amounts of the two gases so that the amount of chlorine vapor in contact with the methyl naphthalene vapor is never more than 50% of the stoichoimetric amount required for complete mono-substitution by chlorine of all the methyl naphthalene present, continuously separating the formed chloromethyl naphthalenes from the unreacted methyl naphthalene by fractional distillation and returning the methyl naphthalene to the reactor.

HERBERT STANISLAUS
          BOYD-BARRETT.
    JAMES RONALD HOLKER.
    HERBERT STEINER.

REFERENCES CITED

The following references are of record in the file of this patent:

UNITED STATES PATENTS

| Number | Name | Date |
|---|---|---|
| 1,146,142 | Ellis | July 13, 1915 |
| 1,202,040 | Ellis | Oct. 24, 1916 |

FOREIGN PATENTS

| Number | Country | Date |
|---|---|---|
| 378,866 | Great Britain | Aug. 16, 1932 |

OTHER REFERENCES

Tarbell et al.: Jour. Am. Chem. Soc., vol. 67, 197–9 (1945).

Asolkar et al.: Chem. Abs., vol. 40, 5406 (1946).

Clar et al.: Ber., vol. 64, 2080 (1931).

Schultze: "Ber. der deut. chem. Gesell.," vol. 17, page 1529 (1884).

Scherler: Ibid., vol. 24, pages 3929–30 (1891).